UNITED STATES PATENT OFFICE.

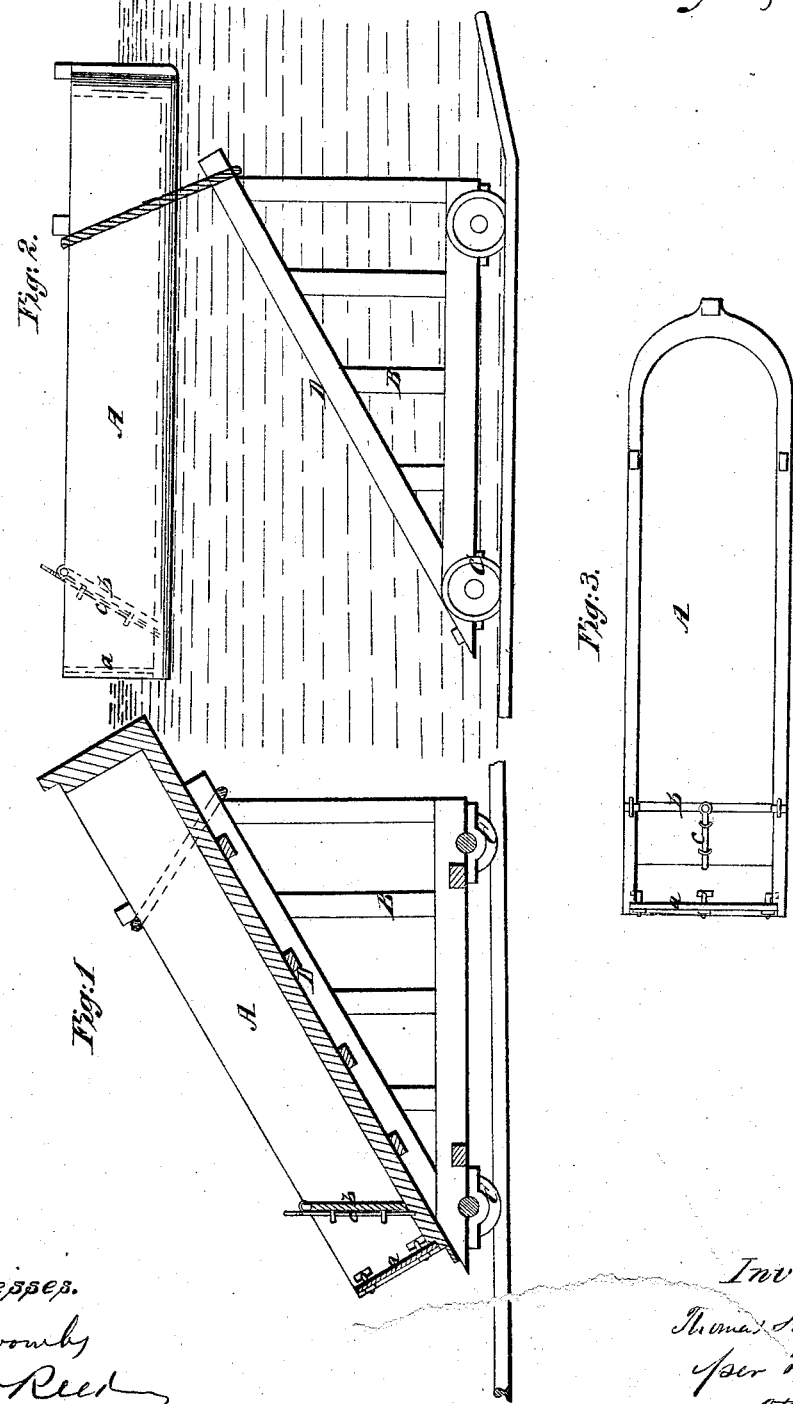
T. Sharp,
Unloading Canal Boats.
N° 39,683. Patented Aug. 25, 1863.

THOMAS SHARP, OF CHICAGO, ILLINOIS.

IMPROVED MODE OF UNLOADING CANAL-BOATS.

Specification forming part of Letters Patent No. 39,683, dated August 25, 1863.

*To all whom it may concern:*

Be it known that I, THOMAS SHARP, of Chicago, in the county of Cook and State of Illinois, have invented a new and useful Improvement in Unloading Canal-Boats; and I hereby declare that the following is a full, clear, and exact description of the same, reference being had to the accompanying drawings, forming a part of this specification, in which—

Figure 1 represents a longitudinal vertical section of my invention. Fig. 2 is a side elevation of the same. Fig. 3 is a plan or top view of the same.

Similar letters of reference in the three figures indicate corresponding parts.

The object of this invention is a canal-boat so constructed and combined with a truck that a cargo of coal or any other cargo in bulk can be unloaded without the use of the shovel or ordinary manual labor.

This invention consists in the arrangement of a door or slide in the end of the boat, in combination with a movable bulk-head or abutment in such a manner that when the boat is placed in an inclined position the cargo is prevented by the bulk-head from pressing on the movable end of the boat, and on removing said end and opening the bulk-head the cargo discharges spontaneously.

The invention consists, also, in the employment or use of a truck with an inclined platform, in combination with a canal-boat, in such a manner that by said truck the canal-boat can be readily brought in an inclined position, so that the cargo will discharge through the movable end of the boat by its inherent gravity.

To enable others skilled in the art to fully understand and apply my invention, I will proceed to describe it.

A represents a canal-boat, which is constructed in the ordinary form and manner. Its end *a* is secured to the hull of the boat by hooks or screws or any other suitable means, so that it can be readily opened or removed whenever it may be desired.

A short distance from the movable end of the boat is a bulk-head, *b*, which is secured by means of a bolt, *c*, or in any other desirable manner, and fitted to the boat in such a manner that it can be readily withdrawn whenever it is desired to discharge the cargo.

B is a truck, which is made of wood or any other suitable material, and supported by four wheels, C. The platform D of this truck is inclined at an angle of twenty-five or thirty degrees, and when it is desired to discharge a boat the truck is brought under the boat, while the latter floats in the lock, as shown in Fig. 2 of the drawings. The lock is made with an inclined plane leading from the bottom of the same gradually up, and when the bow of the boat has been secured to the highest part of the truck by a rope or other desirable means the truck is drawn up the inclined plane. As the truck rises the boat will gradually settle down upon the platform in an inclined position, as clearly shown in Fig. 1, and it can now be carried on the truck to any place wherever the cargo is to be discharged. When arrived at the desired place, the movable end of the boat is taken off, and the bolt *c* is withdrawn to allow the bulk-head *b* to swing open. The cargo will then discharge by its own inherent gravity, and it may only be necessary to help it along by occasional stirring. A cargo of coal, grain, or other article in bulk can thus be discharged without the use of the shovel in a very short time at a great saving of time and labor.

What I claim as new, and desire to secure by Letters Patent, is—

1. The arrangement of the movable end *a* and swinging-bulk-head *b*, in combination with the boat A, constructed and operating in the manner and for the purpose substantially as described.

2. The truck B, with an inclined platform, D, in combination with the boat A, when said truck is placed within the lock of a canal upon suitable guide-rails connected with an inclined plane, so that when the water is drawn from the lock the boat shall rest on the truck and be placed in a convenient position for unloading.

THOMAS SHARP.

Witnesses:
W. E. MAUS,
J. A. HOISINGTON.